United States Patent
Park et al.

(10) Patent No.: US 12,232,180 B2
(45) Date of Patent: *Feb. 18, 2025

(54) APPARATUS AND METHOD FOR PERFORMING RANDOM ACCESS IN WIRELESS COMMUNICATION SYSTEM

(71) Applicant: Innovative Technology Lab Co., Ltd., Seoul (KR)

(72) Inventors: Dong Hyun Park, Seoul (KR); Ki Bum Kwon, Seoul (KR); Hyo Sun Yang, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 266 days.

This patent is subject to a terminal disclaimer.

(21) Appl. No.: 17/875,408

(22) Filed: Jul. 28, 2022

(65) Prior Publication Data

US 2022/0369381 A1 Nov. 17, 2022

Related U.S. Application Data

(63) Continuation of application No. 17/148,540, filed on Jan. 13, 2021, now Pat. No. 11,432,341, which is a (Continued)

(30) Foreign Application Priority Data

Jan. 12, 2018 (KR) ........................ 10-2018-0004649
Apr. 6, 2018 (KR) ........................ 10-2018-0040521

(51) Int. Cl.
*H04W 74/0838* (2024.01)
*H04W 74/00* (2009.01)
*H04W 74/0833* (2024.01)

(52) U.S. Cl.
CPC ..... *H04W 74/0833* (2013.01); *H04W 74/006* (2013.01)

(58) Field of Classification Search
CPC ........... H04W 74/0833; H04W 74/006; H04W 72/0446; H04W 72/0453; H04W 74/002;
(Continued)

(56) References Cited

U.S. PATENT DOCUMENTS

2010/0110964 A1  5/2010  Love et al.
2015/0358983 A1  12/2015  Frenger et al.
(Continued)

FOREIGN PATENT DOCUMENTS

CN  102440057 A  5/2012
CN  104081862 A  10/2014
(Continued)

OTHER PUBLICATIONS

"3rd Generation Partnership Project; Technical Specification Group Radio Access Network; NR; Physical layer procedures for control (Release 15)," 3GPP TS 38.213 V15.0.0, Dec. 2017, pp. 1-56, 3GPP Organizational Partners.

(Continued)

*Primary Examiner* — Thai Nguyen

(57) ABSTRACT

Provided is a method and apparatus for performing a random access procedure. A wireless device may transmit a random access preamble and may monitor for a random access response. The wireless device may determine to transmit a second random access preamble or to transmit uplink data responsive to the random access response. A time for preparing the second random access preamble may be determined based on a subcarrier spacing associated with the random access preamble or a subcarrier spacing associated a downlink channel associated with the random access response. A time for preparing the uplink data may be (Continued)

determined based on a subcarrier spacing associated with the uplink data or a subcarrier spacing associated a downlink channel associated with the random access response.

42 Claims, 9 Drawing Sheets

Related U.S. Application Data continuation of application No. 16/246,717, filed on Jan. 14, 2019, now Pat. No. 10,925,095.

(58) Field of Classification Search
CPC .. H04W 74/00; H04W 72/21; H04L 27/26025
See application file for complete search history.

(56) References Cited

U.S. PATENT DOCUMENTS

| | | | | |
|---|---|---|---|---|
| 2018/0077696 | A1* | 3/2018 | Lee | H04W 72/02 |
| 2019/0053080 | A1* | 2/2019 | Ryu | H04L 5/0048 |
| 2019/0182682 | A1* | 6/2019 | Kim | H04W 74/08 |

FOREIGN PATENT DOCUMENTS

| | | |
|---|---|---|
| KR | 1020110070795 | 6/2011 |
| KR | 1020170114971 | 10/2017 |
| WO | 2008024788 A2 | 2/2008 |

OTHER PUBLICATIONS

"3rd Generation Partnership Project; Technical Specification Group Radio Access Network; NR; Physical layer procedures for data (Release 15)," 3GPP TS 38.214 V15.0.0, Dec. 2017, pp. 1-71, 3GPP Organizational Partners.
Intel Corporation, 'Subcarrier spacing and scaling for new Rat', R1-164179, 3GPP TSG RAN WG1 Meeting #85, May 14, 2016.
Nec, 'Subcarrier spacing and other parameters for numerology', R1-164486, 3GPP TSG RAN WG1 Meeting #85, May 13, 2016.
International Search Report in International Patent Application No. PCT/KR2017/005523, Sep. 9, 2017.
International Search Report (PCT/KR2019/000556).
Written Opinion of The International Search Authority (PCT/KR2019/000556).
Notification of Transmittal of the International Search Report and the Written Opinion of the International Search Authority, Or the Declaration (PCT/KR2019/000556).
3GPP TSG-RAN WG1 Meeting 91 R1-1720653 Reno, Nevada, USA, Nov. 27-Dec. 2, 2017. "Remaining Details on RACH Procedure". Qualcomm Incorporated.
3GPP TSG-RAN WG1 Meeting 91 R1-1719569 Reno, USA, Nov. 27-Dec. 2, 2017. "Remaining details on RACH Procedure". MediaTek Inc.
3GPP TSG-RAN WG1 #NR3 R1-1716138 Nagoya, Japan, Sep. 18-21, 2017. "Remaining details on RACH Procedure". Nokia, Nokia Shanghai Bell.
3GPP TSG-RAN WG1 Meeting NR#3 R1-1715846 Nagoya, Japan, Sep. 18-21, 2017. "RACH procedure". LG Electronics.
Nokia, Alcatel-Lucent Shanghai Bell, "NR Random Access Procedure", 3GPP TSG-RAN WG1 #88bis, R1-1704943; Spokane, USA, Apr. 3-7, 2017, pp. 1-9.
Extended European Search Report for European Patent Application No. 19 738 295.5.
1st Office Action from China National Intellectual Property Administration (CNIPA) issued in Jul. 28, 2023; Application No. 201980008121.1; Applicant: Innovative Technology Lab Co., Ltd; Title: Apparatus and Method for Performing Random Access in Wireless Communication System.
3GPP tsg_ran\WG1_RL1; "R1-1720653"; Issue Date: Nov. 18, 2017; Title: Remaining Details on RACH Procedure Source: MediaTek Inc.
3GPP tsg_ran\WG1_RL1; "R1-1719569_MTK_Remaining_details_on-RACH_procedure_final"; Issue Date: Nov. 18, 2017; Title: Remaining details on RACH procedure Source: Qualcomm Incorporated.

* cited by examiner

APPARATUS AND METHOD FOR PERFORMING RANDOM ACCESS IN WIRELESS COMMUNICATION SYSTEM

CROSS-REFERENCE TO RELATED APPLICATIONS

This application is a continuation of a U.S. patent application Ser. No. 17/148,540, filed on Jan. 13, 2021, which is a continuation of a U.S. patent application Ser. No. 16/246,717, filed on Jan. 14, 2019, now issued as U.S. Pat. No. 10,925,095 on Feb. 16, 2021, which claims priority from and the benefit of Korean Patent Application Nos. 10-2018-0004649, filed on Jan. 12, 2018, and 10-2018-0040521, filed on Apr. 6, 2018, each of which is hereby incorporated by reference in its entirety.

BACKGROUND

1. Field

The present disclosure relates to a wireless communication, and more particularly, to an apparatus and method for performing a random access.

2. Discussion of the Background

The IMT (International Mobile Telecommunication) frameworks and standards have been developed by ITU (International Telecommunication Union) and, recently, the 5th generation (5G) communication has been discussed through a program called "IMT for 2020 and beyond".

In order to satisfy requirements from "IMT for 2020 and beyond", the discussion is in progress about a way for enabling the 3rd Generation Partnership Project (3GPP) New Radio (NR) system to support various numerologies by taking into consideration various scenarios, various service requirements, potential system compatibility.

Also, the NR system considers transmission of a physical signal/channel through a plurality of beams to overcome a poor channel environment, such as high pathloss occurring in a relatively high carrier frequency, phase-noise, and frequency offset.

Also, a random access procedure and a minimum transmission timing requirement method have not been defined in detail so far to provide a random access channel (RACH) uplink transmission supporting different numerologies (subcarrier spacings), a slot structure (slot or non-slot), a carrier (normal carrier or subcarrier), and transmission of a plurality of beams even in the NR system.

SUMMARY

An aspect of the present disclosure provides a method and apparatus for transmitting a random access preamble.

An aspect of the present disclosure provides a method and apparatus for performing a random access procedure.

An aspect of the present disclosure provides a method and apparatus for determining timing parameters for random access procedure.

A wireless device may transmit, to a base station, a first random access preamble, determine, based on a transmission time point associated with the first random access preamble, a time window for monitoring for a random access response, receive, during the time window, a first random access response, and prepare, based on the first random access response, a transmission of a second random access preamble. A time for the preparing may be set based on one of a first subcarrier spacing associated with the first random access preamble and a second subcarrier spacing associated with the first random access response. The wireless device may transmit, based on the preparing, the second random access preamble.

The wireless device may transmit, to a base station, a first random access preamble, determine, based on a transmission time point associated with the first random access preamble, a time window for monitoring for a random access response, determine that a random access preamble associated with the first random access preamble has not been detected during the time window, and prepare, based on an expiration of the time window, a transmission of a second random access preamble. A time for the preparing is set based on one of a first subcarrier spacing associated with the first random access preamble and a second subcarrier spacing associated with a downlink channel scheduled for the random access response. The wireless device may transmit, based on the preparing, the second random access preamble.

The wireless device may receive a random access response that is responsive to a random access preamble. The wireless device may prepare, based on one or more transport blocks of the random access response, an uplink transmission that is responsive to the random access response. A time for the preparing may be set based on one of a subcarrier spacing associated with the random access response and a subcarrier spacing associated with the uplink transmission. The wireless device may perform, based on the preparing, the uplink transmission.

A minimum amount of time required for UE processing and a transmission timing between a random access procedure used for an initial system access and various purposes (uplink synchronization, handover, beam failure recovery, RRC establishment) in an NR system and each of random access messages may be clarified and efficient communication between a UE and an eNode B may be performed.

DETAILED DESCRIPTION

Figure 1:
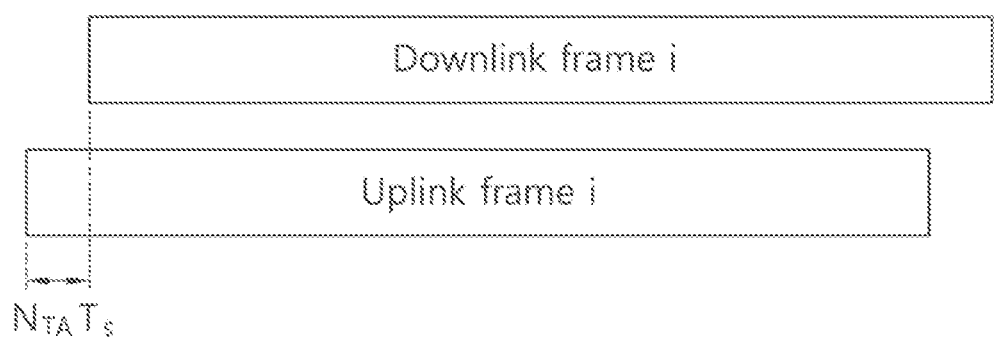
FIG. 1 illustrates an example of describing a timing between a downlink frame and an uplink frame.

Various examples will be described more fully hereinafter with reference to the accompanying drawings. Throughout the drawings and the detailed description, unless otherwise described, the same drawing reference numerals are understood to refer to the same elements, features, and structures.

In describing the examples, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. In contrast, when an element is referred to as being "directly on," "directly connected to" or "directly coupled to" another element, there are no intervening elements present.

In the described exemplary system, although methods are described based on a flowchart as a series of steps or blocks, aspects of the present disclosure are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present disclosure. When an embodiment is embodied as software, the described scheme may be embodied as a module (process, function, or the like) that executes the described function. The module may be stored in a memory and may be executed by a processor. The memory may be disposed inside or outside the processor and may be connected to the processor through various well-known means.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), gNodeB (gNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

In the following description, a system to which various examples of the present disclosure are applied may be referred to as a New Radio (NR) system to be distinguished from other existing systems. The NR system may include one or more features defined by TS38 series of the third partnership project (3GPP) specification. However, the scope of the present disclosure is not limited thereto or restricted thereby. In addition, although the term 'NR system' is used herein as an example of a wireless communication system capable of supporting a variety of subcarrier spacings (SCSs), the term 'NR system' is not limited to the wireless communication system for supporting a plurality of subcarrier spacings.

FIG. 1 illustrates an example of describing a timing between a downlink frame and an uplink frame.

Referring to FIG. 1, a timing or a time structure between a downlink frame for downlink transmission and an uplink frame for uplink transmission has $T_f=(\Delta f_{max}N_f/100) \cdot T_s=10$ ms. Here, ten subframes corresponding to $T_{sf}=(\Delta f_{max}N_f/100) \cdot T_s=1$ ms constitute a single frame. A transmission timing of an uplink frame i is determined by a UE according to $T_{TA}=N_{TA}T_s$ based on a reception timing of a downlink frame i. Here, a value of $N_{TA}$ denotes a TA value indicated by an eNode B and $T_s$ denotes a minimum time unit sample of an NR system.

Figure 2:
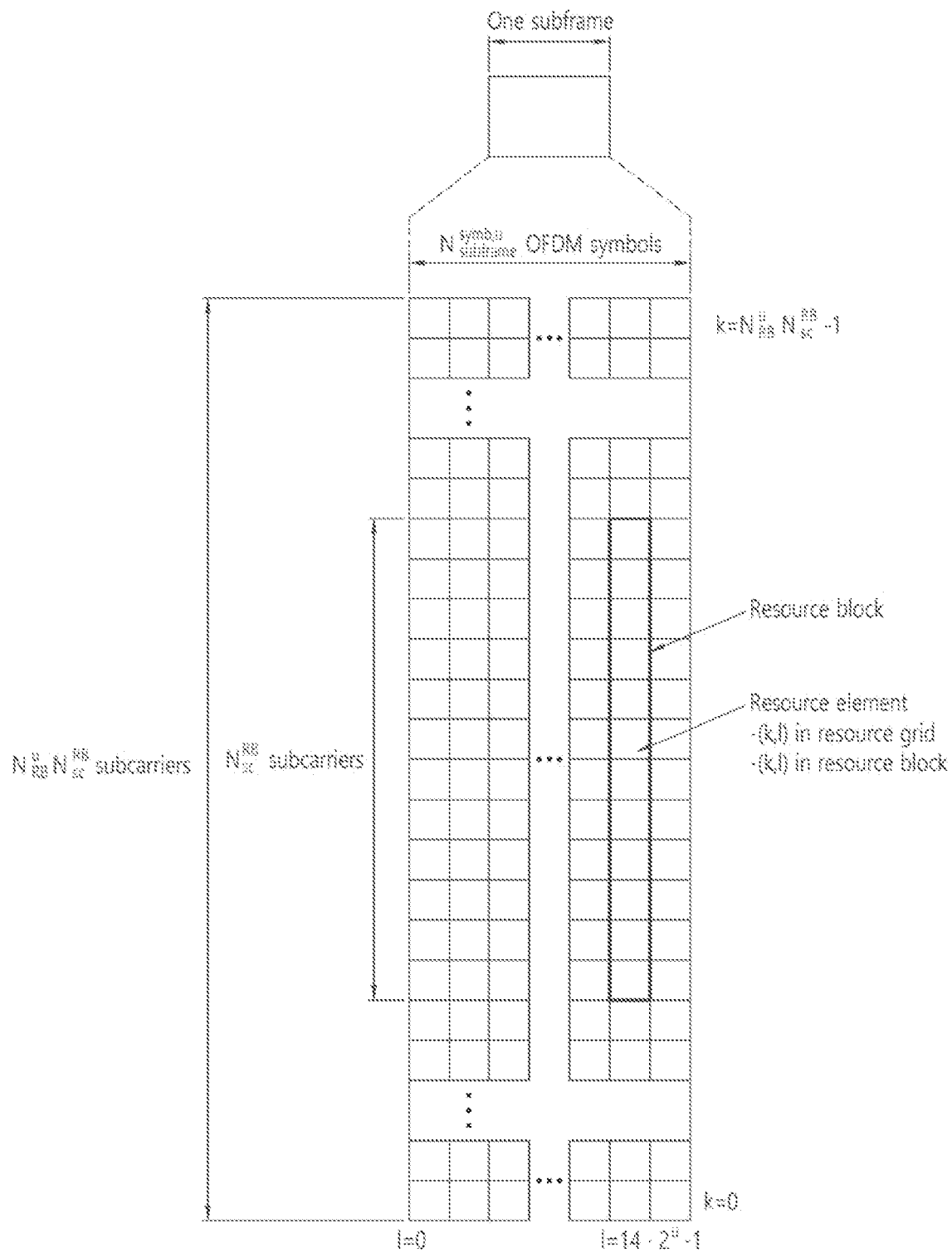
FIG. 2 illustrates an example of a resource grid and a resource block.

FIG. 2 illustrates an example of a resource grid and a resource block.

Referring to FIG. 2, a resource element within a resource grid is indexed based on each subcarrier spacing. A single resource grid may be generated per subcarrier spacing of each antenna port and uplink/downlink transmission and reception may be performed based on the corresponding resource grid. A single resource block is configured on a frequency domain using 12 resource elements ($N^{RB}_{sc}=12$) and configures an index $n_{PRB}$ for a single resource block every 12 resource elements. An index of the resource block may be used in a specific frequency band or system bandwidth.

$$n_{PRB} = \left\lfloor \frac{k}{N^{RB}_{sc}} \right\rfloor \quad \text{[Equation 1]}$$

Numerologies to define resources of a physical layer may be defined based on at least one of physical layer parameters (e.g., a subcarrier spacing, a CP length, a number of OFDM symbols per slot) used in an orthogonal frequency division multiplexing (OFDM) system, as shown in Table 1. The NR system is designed to meet various services and requirements and various numerology configurations are required.

TABLE 1

| μ | $\Delta f = 2^\mu \cdot 15[kHz]$ | Cyclic Prefix (CP) |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |

A normal slot may be defined based on a basic time unit used for the NR system to transmit a single piece of data and control information. A length of the normal slot may basically include 14 OFDM symbols. Dissimilar to a slot, a subframe may have an absolute time length corresponding to 1 ms in the NR system and may be used as a reference time for a length of another time section. For example, a time section, such as a long term evolution (LTE) subframe for coexistence of LTE and NR, may be required for an NR standard.

A non-slot may be defined as a slot having a number of symbols less by at least one symbol than that of the normal slot and is introduced to basically provide a low delay time of ultra-reliable and low latency communications (URLLC) service. For example, a non-slot may be used based on a frequency range. For example, a non-slot with a length of 1

OFDM symbol may be considered in a frequency range of 60 gigahertz (GHz) or more. However, the number of OFDM symbols used to define the non-slot may include at least two OFDM symbols and the range thereof may be configured with a mini-slot length up to a normal slot length −1. However, the range thereof may be generally limited to 2, 4, or 7 symbols.

In the case of a normal CP, a number of OFDM symbols per slot $N_{symbol}^{slot}$, a number of slots per frame $N_{slot}^{frame,u}$, and a number of slots per subframe $N_{slot}^{subframe,u}$ per setting of each subcarrier spacing are defined as shown in Table 2.

TABLE 2

| μ | $N_{symbol}^{slot}$ | $N_{slot}^{frame,u}$ | $N_{slot}^{subframe,u}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 2 provides the number of OFDM symbols per slot, the number of slots per frame, and the number of slots per subframe according to each subcarrier spacing value of Table 2, based on 14 normal slots.

Table 3 shows a number of OFDM symbols per slot $N_{symbol}^{slot}$, a number of slots per frame $N_{slot}^{frame,u}$, and a number of slots per subframe $N_{slot}^{subframe,u}$ per setting of each subcarrier spacing in the case of an extended CP.

TABLE 3

| μ | $N_{symbol}^{slot}$ | $N_{slot}^{frame, \mu}$ | $N_{slot}^{subframe, \mu}$ |
|---|---|---|---|
| 2 | 12 | 40 | 4 |

Similar to Table 2, Table 3 provides the number of symbols per slot, the number of slots per frame, and the number of slots per subframe in the case of the extended CP that follows 60 kHz subcarrier spacing corresponding to μ=2.

Figure 3:
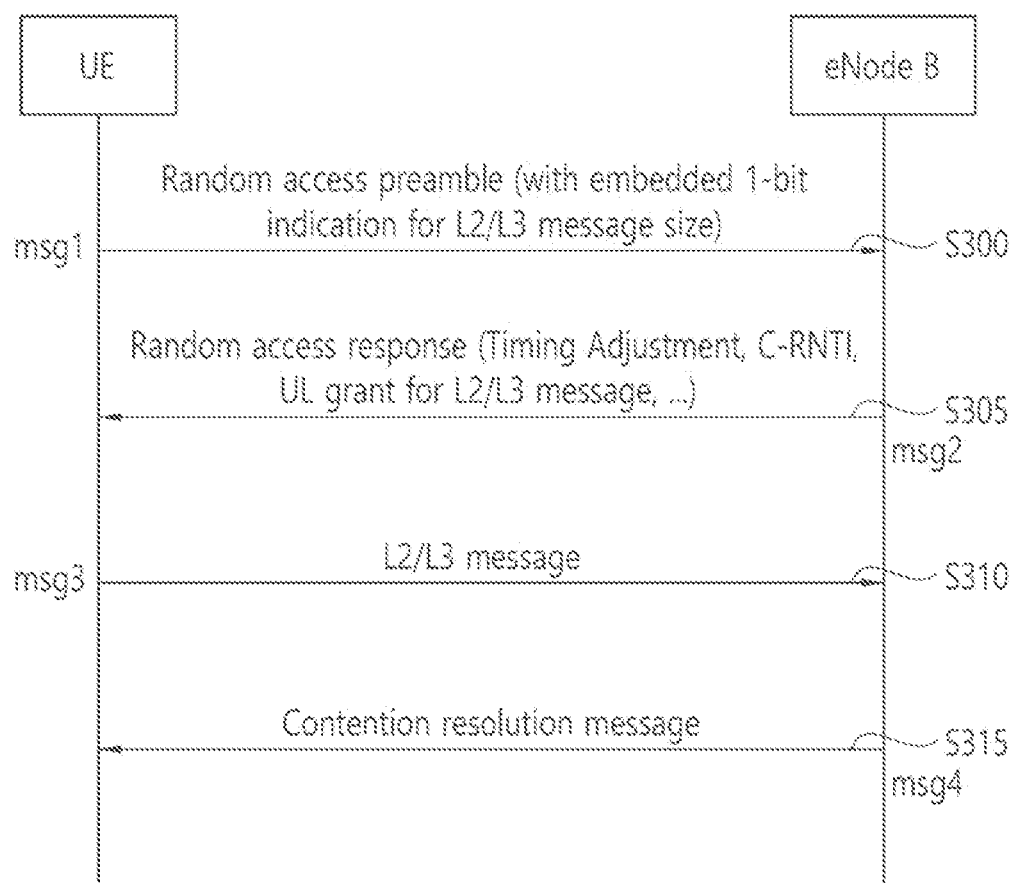
FIG. 3 illustrates an example of a random access procedure.

FIG. 3 illustrates an example of a random access procedure.

Referring to FIG. 3, in operation S300, a UE performs a random access initialization and transmits a random access preamble to an eNode B.

Hereinafter, a random access initialization operation is described. The random access initialization is performed by a physical downlink control channel (PDCCH) order, a medium access control (MAC) sublayer, a radio resource control (RRC) sublayer, and a beam failure (BF) indication from a physical layer.

A random access is triggered based on a detailed cause and an event. Table 4 shows a mapping relationship between the cause and the event that trigger the random access.

TABLE 4

| Event | Initiated by | Note |
|---|---|---|
| Initial access from RRC_IDLE | MAC sublayer | RRCConnectionRequest triggers R-BSR |
| RRC Connection Reestablishment | MAC sublayer | RRCConnectionReestablishment-Request triggers R-BSR |
| Handover | MAC sublayer | RRCConnection-ReconfigurationComplete triggers R-BSR |
| DL data arrival | PDCCH order | NW triggers random access |

TABLE 4-continued

| Event | Initiated by | Note |
|---|---|---|
| UL data arrival | MAC sublayer | New data arrival triggers R-BSR |
| Positioning | PDCCH order | NW triggers random access |
| PSCell management | RRC sublayer | R-BSR triggered by RRCConnection-ReconfigurationComplete does not initiate random access in PSCell |
| STAG management | PDCCH order | NW triggers random access in SCell |
| Beam Failure | Beam Failure indication | BF indication from a lower layer |
| On demand SI | MAC sublayer | RRC trigger R-BSR |

A random access procedure on SCell excluding a special serving cell (SpCell) in a master cell group (MCG) or a secondary cell group (SCG) for dual connection is initialized with a random access preamble index value indicated by the PDCCH order.

The random access procedure may be performed based on a parameter preconfigured through RRC signaling. Accordingly, information of Table 5 may be provided to the UE through RRC signaling.

TABLE 5

| Random access parameter information | Note |
|---|---|
| Prach-ConfigIndex | Set of available PRACH resources for preamble transmission |
| ra-PreambleInitialReceivedTargetPower | Initial preamble power |
| rsrp-ThresholdSSB | Selection of related preamble resource and index based on sync signal block (SSB) reference signal received power (RSRP) value |
| csirs-dedicatedRACH-Threshold | Selection of related preamble resource and index based on CSI-RS RSRP value |
| sul-RSRP-Threshold | RSRP threshold for selection of the SS block and corresponding PRACH resource |
| ra-PreamblePowerRampingStep | Power-ramping factor |
| ra-PreambleIndex | Random access preamble index |
| ra-PreambleTx-Max | Maximum number of preamble transmissions |

Also, a mapping relationship between each sync signal block (SSSB) and a preamble transmission resource/index may be preconfigured. A group of preamble indices and indices in the group may be sequentially assigned to each SSB depending on whether mapping between each SSB and the preamble transmission resource/index is preconfigured. The preamble group is used for the eNode B to estimate an uplink resource size required to transmit message 3 (msg3). For example, with the assumption that preamble groups A and B are configured in the UE, if the random access procedure corresponds to a case of at least ra-Msg3 Size-GroupA and a high DL pathless value less than a value excluding a preamble initial target received power from PCMAX indicating a maximum UE power, the UE selects a preamble index in the group B and performs the random access procedure. Here, when the random access preamble in the group B is verified to be received, the eNode B performs scheduling for the UE by including information on the uplink resource size required for msg3 transmission in message (msg2) that is response information to the corresponding preamble.

Also, it is assumed that a mapping relationship between the SSB and the preamble transmission resource/index is preconfigured in a situation in which an SSB is separate for each beam. In this case, if the UE transmits a random access preamble using a specific preamble transmission resource/ index, the eNode B may be aware of a beam (or SSB) preferred by the UE.

Size of random access (RA) window: indicates to the UE with a number of slots.

Preamble index set for SI request and corresponding PRACH resource (if necessary)

Beam failure request response window and corresponding PRACH resource (if necessary)

Ra-ContentionResolutionWindow: indicates a size of contention resolution window.

Hereinafter, the random access initialization and the random access preamble transmission of operation S300 will be further described.

The UE flushes a buffer that includes msg3, sets a preamble transmission counter to 1, sets a preamble power ramping counter to 1, and sets a preamble back-off to 0 ms.

The UE performs a carrier selection procedure. In detail, if a carrier on which the random access procedure is to be performed is explicitly signaled, the UE performs the random access procedure on the corresponding carrier.

Otherwise, that is, if the carrier on which the random access procedure is to be performed is not explicitly signaled, and if a supplementary uplink cell (SUL cell) for the random access procedure is set and a reference signal received power (RSRP) value of DL pathless of the corresponding cell is less than a sul-RSRP threshold, the UE selects the SUL cell as a carrier for performing the random access procedure, and sets a PCMAX value for SUL. Otherwise, the UE selects a normal carrier as the carrier for performing the random access procedure and sets a PCMAX value for the normal carrier.

The UE performs a resource selection procedure. The resource selection procedure includes an operation of setting a preamble index value and determining a related next available PRACH occasion. The available PRACH occasion is determined based on i) a case in which a correlation setting between an SSB index and the PRACH occasion is present, ii) a case in which a correlation setting between CSI-RS and the PRACH occasion is present, or iii) a case in which the correlation settings are not provided to the UE. When the correlation setting between the SSB or CSI-RS and the PRACH occasion is present, a related PRACH occasion is determined based on SSB or CSI-RS selected by the UE. Conversely, if the correlation setting is absent, the UE performs a preamble transmission in the next available PRACH occasion.

The UE transmits the random access preamble based on the determined PRACH occasion. Here, a MAC layer of the UE indicates preamble transmission by providing a selected preamble, a related radio network temporary identifier (RNTI) value, a preamble index, and received target power to a PHY layer. Accordingly, transmission of the random access preamble by the UE in operation S300 is terminated.

In operation S305, the eNode B transmits, to the UE, a random access response (RAR) corresponding to the preamble received in operation S300. That is, the UE receives the RAR from the eNode B. The RAR occurs after msg1 (preamble) transmission and thus, is also referred to as message 2 (msg2).

The UE starts monitoring for receiving msg2 after a predetermined symbol (e.g., OFDM symbol) after transmitting the random access preamble. A time section (definable with a number of slots) in which the UE performs monitoring for receiving msg2 is referred to as a random access (RA) window. The RA window is provided from the eNode B to the UE. Monitoring is performed based on a RA-RNTI value and includes monitoring of PDCCH and/or physical downlink shared channel (PDSCH). Here, the RA-RNTI value is determined based on a first OFDM symbol index, a first slot index, a frequency resource index, and a carrier index associated with transmission of the preamble.

If response information is not included in the received msg2, the UE determines that reception of the RAR is a failure and prepares retransmission of the random access preamble (msg1), and performs again the preamble resource selection procedure. For the UE to retransmit msg1 in the NR system, a timing requirement for msg1 retransmission preparation needs to be defined.

Conversely, if response information (or random access preamble ID) is included in the received msg2, the UE determines that reception of the RAR is a success. If reception of the RAR is a success, the UE transmits msg3 to the eNode B based on scheduling information included in msg2 and/or parameter information for msg3 transmission in operation S310. That is, the eNode B receives msg3 from the UE. If the UE successfully receives msg2 during the random access procedure, a timing for the UE to transmit msg3 needs to be defined. In particular, when msg2 and msg3 are transmitted through frames (or slots) according to different numerologies (e.g., subcarrier spacings SCSs), a corresponding timing indication method is required.

The UE starts a contention resolution timer and performs monitoring a C-RNIT scrambled PDCCH for receiving msg4 while the contention resolution timer is operating.

If the eNode B successfully receives msg3, the eNode B transmits a contention resolution message (msg4) to the UE in operation S315. If msg4 is received during the contention resolution timer, the UE determines that the contention resolution is successfully performed.

The contention based random access requires performing all of operations S300 to S315, and the contention free random access requires performing operations S300 and S305.

Timing Requirement for Retransmission Preparation for msg1

In the NR system, the UE may transmit a single random access preamble and may also transmit a plurality of random access preambles to perform a single random access procedure. Therefore, the timing requirement for retransmission preparation may need to be determined differently depending on whether a number of random access preambles to be retransmitted is singular or plural.

A single random access preamble may be transmitted or retransmitted during a single random access procedure:

The UE may or may not receive msg2 in response to transmission of msg1. Although the UE receives msg2, reception of a RAR is not a success if response information is not included in msg2. Therefore, the UE needs to wait for receiving msg2 in which the response information is included and needs to retransmit msg1 if msg2 including the response information is not received within a random access (RA) window. If the UE does not receive msg2 within the RA window, the UE performs retransmission of msg1. That is, the UE needs to prepare for retransmission of msg1 based on i) a case in which the UE receives msg2 in which response information is not included during the RA window or ii) a case in which the UE does not receive msg2 during the RA window. Hereinafter, i) and ii) will be referred to as Case 1-1 and Case 1-2, respectively, and thereby described.

Figure 4:
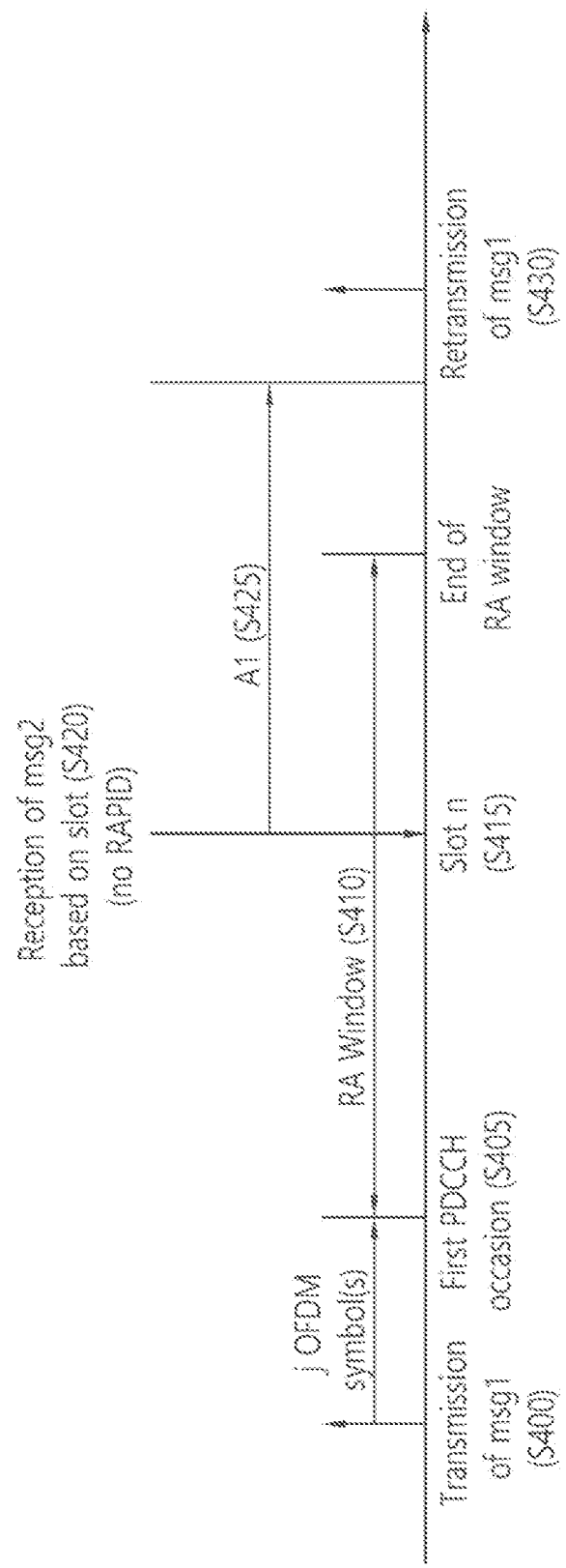
FIG. 4 illustrates an example of a retransmission timing of a random access preamble.
Figure 5:
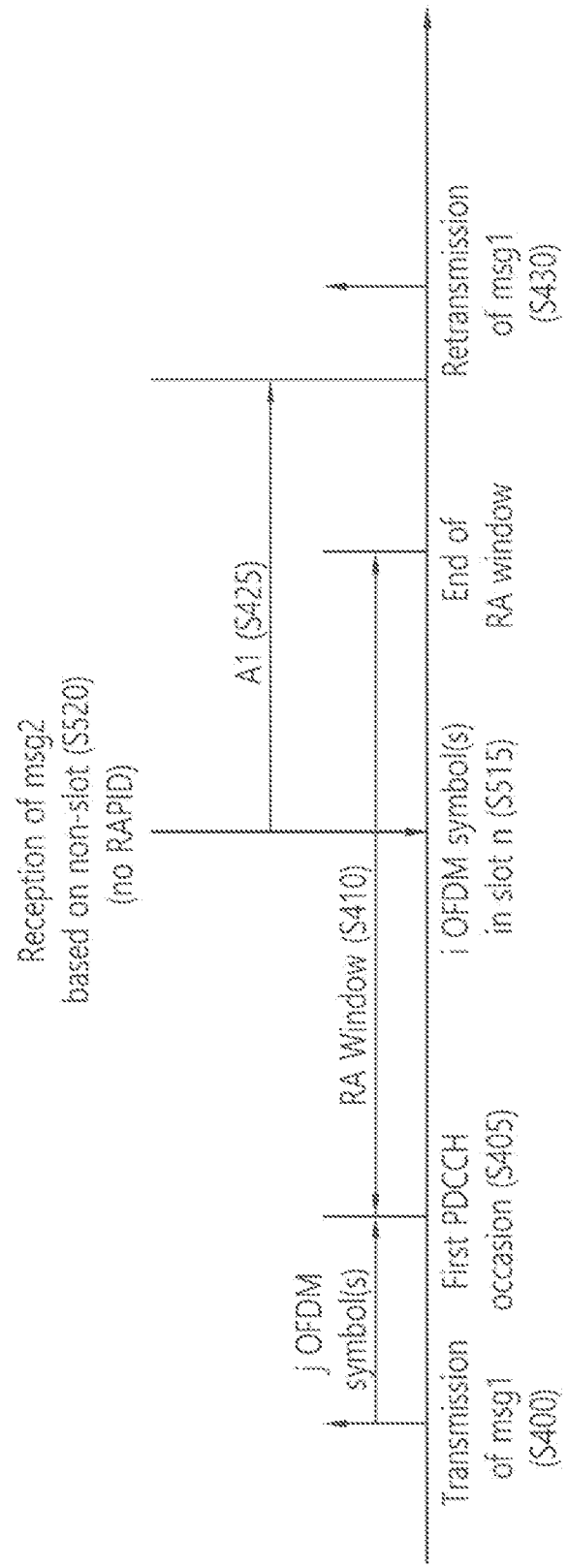
FIG. 5 illustrates another example of a retransmission timing of a random access preamble.

The UE may receive msg2 in a specific slot or OFDM symbols within a slot during the RA window, however, response information (RAPID) on msg1 (preamble) may not be included in msg2:

A retransmission timing of msg1 may be differently determined depending on whether transmission of msg2 is based on a slot or a non-slot. FIG. 4 illustrates a case in which transmission of msg2 is based on a slot and FIG. 5 illustrates a case in which transmission of msg2 is based on a non-slot.

FIG. 4 illustrates an example of a retransmission timing of a random access preamble.

Referring to FIG. 4, when the UE transmits msg1 (S400), a first PDCCH occasion occurs after j OFDM symbol(s) (S405). At this point in time, an RA window starts (S410). The UE receives a RA-RNTI scrambled PDCCH and a DL-SCH transmission block (including msg2) associated with the PDCCH in a slot n S415 (S420). That is, since transmission of msg2 is based on a slot, a retransmission timing of msg1 may be differently determined based on a slot. Although the UE decodes msg2, response information on msg1 (or preamble sequence) may not be included in msg2. Here, the UE prepares retransmission of the random access preamble by A1 timing at the latest in response to a request of an upper layer (i.e., MAC layer) (S425). When retransmission of the random access preamble is prepared, the UE retransmits msg1 after A1 (S430).

In FIG. 4, basically, in addition to a MAC layer processing delay time (L2) and a processing delay margin (delta value), parameters, that is, a slot n (OFDM symbol index i in a slot), K, and N may be defined to determine the A1 timing. The UE prepares transmission of a new random access preamble according to the A1 timing that is determined based on at least one combination of the three timing determining parameters in addition to the MAC layer processing delay time (L2) and the processing delay margin. The MAC layer processing delay time (L2) and the processing delay margin are basically assumed to determine the A1 timing for retransmission of msg1. Under this assumption, additional time related parameters are discussed.

For example, the UE prepares transmission of a new random access preamble by (slot n)+K at the latest (A1=K). In this example, the A1 timing is determined based on a slot level.

As another example, the UE prepares transmission of the new random access preamble by (slot n)+K+N at the latest (A1=K+N). In this example, the A1 timing is determined based on a combination of a slot level and a symbol level.

As another example, the UE prepares transmission of the new random access preamble by (slot n)+N at the latest (A1=N). In this example, the A1 timing is determined based on a symbol level.

Hereinafter, each timing determining parameter will be further described.

With respect to the slot n, a time length of a slot in the NR system is determined based on an SCS. A timing for retransmission of a random access preamble is determined based on a slot that is defined according to the NR system. Here, a number n of the slot is considered.

K denotes a minimum number of slots required for retransmission of a next random access preamble after receiving msg2. According to an aspect, K denotes a time gap K1 between the slot n in which the UE receives a PDSCH and a slot n+K1 in which the UE transmits an ACK/NACK signal for the PDSCH. According to another aspect, K denotes a time gap K2 between the slot n in which the UE receives a PDCCH including an uplink grant and a slot n+K2 in which the UE performs physical uplink shared channel (PUSCH) transmission corresponding to the uplink grant.

N represents, using a number of OFDM symbols, a minimum timing required time for retransmission of a random access preamble in a specific OFDM symbol within the slot determined by K after the UE receives msg2.

Values of the three timing determining parameters may be defined as shown in Table 6.

TABLE 6

| Timing determining parameter | Value |
| --- | --- |
| K1 | 0, 1, 2, 3, . . . , 15 |
| K2 | 0, 1, 2, 3, 4, 5, 6, 7 |
| N | {K2, index-start, len-index} (OFDM symbol unit) |

Alternatively, N may be defined using values used for hybrid automatic repeat request (HARD) timing as shown in Table 7.

TABLE 7

| Configuration | HARQ timing parameter | Unit | 15 kHz SCS | 30 kHz SCS | 60 kHz SCS | 120 kHz SCS |
| --- | --- | --- | --- | --- | --- | --- |
| Front-loaded DMRS only | N1 | symbol | 8 | 10 | 17 | 20 |
| Front-loaded + additional DMRS | N1 | symbol | 13 | 13 | 20 | 24 |
| Frequency-first RE-mapping | N2 | symbol | 10 | 12 | 23 | 36 |

Here, if a first symbol of a PUSCH includes only data or is frequency division multiplex (FDM) data including a demodulation reference signal (DMRS), a single symbol is added to N2 in Table 7. Referring to Table 7, N1 denotes a number of OFDM symbols between reception of the PDSCH and transmission of A/N information and N2 denotes a number of OFDM symbols between reception of the uplink grant and transmission of the corresponding PUSCH. Also, similar to N1, N2 may have a HARQ timing parameter for "Front-loaded+additional DMRS" depending on the UE capability.

All of the timing determining parameters K1, K2, and N may apply based on an SCS of a slot in which msg2 is transmitted or an SCS of a UL carrier/bandwidth part in which msg1 is transmitted. Although the following description is made based on the SCS for msg2, the SCS of the UL carrier/bandwidth part in which msg1 is transmitted may be used. For example, if the SCS of the slot in which msg2 is transmitted is 30 kHz, a slot section corresponding to 30 kHz is applied to determine the A1 timing. That is, the same SCS as that of the slot in which msg2 is transmitted is applied to a slot as a parameter for determining a retransmission timing of msg1.

In the meantime, the UE may recognize timing determining parameters using a variety of methods.

According to an aspect, the timing determining parameters K and/or N may be specified as a specific fixed value between the UE and the eNode B or may be implicitly known by the UE without explicit signaling. For example, the timing determining parameters K and/or N may be defined as a specific fixed value for each SCS of the slot in which msg2 is transmitted. Alternatively, the timing determining parameters K and/or N may be defined as a specific fixed value regardless of the SCS of the slot in which msg2 is transmitted.

According to another aspect, the timing determining parameters K and/or N may be indicated through remaining minimum system information (RMSI) signaling of the eNode B. This indication may be performed based on the SCS of the slot in which msg2 is transmitted.

According to another aspect, the UE prepares transmission of a new random access preamble by (slot n)+K'+N at the latest (A1=K'). In this example, the A1 timing is determined based on a non-slot level. Here, K' denotes a number of non-slots corresponding to the A1 timing.

According to another aspect, the timing determining parameters K and/or N may be determined based on a HARQ timing indication field carried in the RMSI PDCCH. That is, the HARQ timing indication field indicates K and/or N. Such indication may be performed based on the SCS of the slot in which msg2 is transmitted.

FIG. 5 illustrates another example of a retransmission timing of a random access preamble.

Referring to FIG. 5, operations S400 to S410, and S420 of FIG. 5 are identical to those of FIG. 4 and operation S415 is replaced with operation S515. The UE receives a RA-RNTI scrambled PDCCH and a DL-SCH transmission block (including msg2) associated with the PDCCH in a specific index OFDM symbol (i, i+1, . . . ) S515 within a slot n (S520). If the UE decodes msg2 and response information on msg1 (or preamble sequence) is not included in msg2, the UE prepares retransmission of a random access preamble by the A1 timing at the latest in response to a request of an upper layer (i.e., MAC) (S425). Once retransmission of the random access preamble is prepared, the UE retransmits msg1 after A1 (S430).

In operation S520, msg2 may be received over, for example, symbol 2, 4, or 7. That is, since transmission of msg2 is based on a non-slot, the A1 timing for retransmission of msg1 may be determined based on the A1 timing.

For example, the UE prepares transmission of the new random access preamble by (slot n)+K+N at the latest (A1=K+N). In this example, the A1 timing may be determined based on a combination of a slot level and a symbol level.

As another example, the UE prepares transmission of the new random access preamble by (non-slot n)+K'+N at the latest (A1=K'+N). In this example, the A1 timing may be determined based on a combination of a non-slot level and a symbol level.

As another example, the UE prepares transmission of the new random access preamble by (slot n)+N at the latest (A1=N). In this example, the A1 timing may be determined based on a symbol level.

Here, among the parameters for determining the A1 timing, the slot n and K are same as described above with FIG. 4 and N may differ as follows. Here, N may have a value of N1 or N2 according to Table 7. Referring to Table 7, different two values may be defined for a value of N1 for each SCS based on a setting of the UE. A retransmission timing of msg1 is applied based on a larger N value. For example, in Table 7, N1=8 for "Front-loaded DMRS only" in a 15 kHz SCS, and N1=13 for "Front-loaded +additional DMRS". Accordingly, a larger value, that is, 13 may be applied as the value of N1 used for the retransmission timing of msg1. In this manner, an additional margin for a retransmission processing time of the random access preamble may be provided to the UE.

In the meantime, the UE may recognize timing determining parameters using a variety of methods.

According to an aspect, the timing determining parameters K and/or may be specified as a specific fixed value between the UE and the eNode B or may be implicitly known by the UE without explicit signaling. For example, the timing determining parameters K and/or N may be defined as a specific fixed value for each SCS of the slot in which msg2 is transmitted. Alternatively, the timing determining parameters K and/or N may be defined as a specific fixed value regardless of the SCS of the slot in which msg2 is transmitted.

According to another aspect, the timing determining parameters K and/or N may be indicated through RMSI signaling of the eNode B. This indication may be performed based on the SCS of the slot in which msg2 is transmitted.

According to another aspect, the timing determining parameters K and/or N may be determined based on a HARQ timing indication field of downlink control information (DCI) carried in the RMSI PDCCH. That is, the HARQ timing indication field indicates the RMSI PDSCH and K and/or N. Such indication may be performed based on the SCS of the slot in which msg2 is transmitted.

The random access procedure is performed with the assumption that the timing determining parameters recognized by the UE as above are used to determine the A1 timing as a default value before establishment or configuration of an RRC connection and, unless they are configured or indicated using a new value, the timing determining parameters are maintained as the default value.

Additionally, when the random access procedure is performed in response to a beam failure request, the parameter values (K, K', and N) for the random access procedure for another purpose may be independently predetermined or signaled by the eNode B.

Referring to FIGS. 4 and 5, the random access procedure is performed with the assumption that the timing determining parameters recognized by the UE as above are used to determine the A1 timing as a default value before establishment or configuration of an RRC connection and, unless they are configured or indicated using a new value, the timing determining parameters are maintained as the default value.

After the RRC connection, the default value may be replaced. For example, if the random access procedure is initiated in response to PDCCH order or a beam failure request, a new retransmission timing of msg1 may be indicated to the UE using DCI based on an SCS of the PDCCH order or an SCS of a UL carrier/bandwidth part in which msg1 is transmitted. For example, the DCI may indicate a number of slots, a number of OFDM symbols, or (number of slots)+(number of OFDM symbols) representing the timing determining parameter, such as N or K, based on the SCS in which the PDCCH order is transmitted. As another example, based on the SCS of the UL carrier/bandwidth part in which msg1 is transmitted, the number of slots/number of non-slots, a number of OFDM symbols, or (number of slots)+(number of OFDM symbols) may be predefined as follows in addition to a MAC layer processing delay time (L2) and a bandwidth part (BWP) switching time (if switching is required, otherwise, 0).

(slot/non-slot n)+K (or K') or
(slot/non-slot n)+K (or K')+N or
(slot/non-slot n)+N Accordingly, values of N and K (or K') indicated by DCI or a combination thereof may be flexibly and dynamically indicated by the eNode B, or may be defined in advance.

Here, N may have a value of either N1 or N2 defined in Table 7, which may be similar to the features described with respect to FIGS. 4 and 5.

Also, the timing determining parameters in the DCI may be configured or defined in advance through upper layer signaling, such as RRC. The timing determining parameters indicated to the UE as above may replace an old default value. The default value and/or values indicating the timing determining parameters in the DCI may be configured and used through RRC signaling.

Alternatively, a retransmission timing of msg1 may be newly indicated to the UE through an RRC sublayer. The indicated information may replace a default value.

A retransmission timing of single msg1 may be determined based on a symbol (or a number of non-slots) regardless of whether transmission of msg2 is based on a slot or based on a non-slot. There may be no need for another implementation based on a slot form. That is, one of A1 timing requirements may be applied in the same manner regardless of a slot structure.

Figure 6:
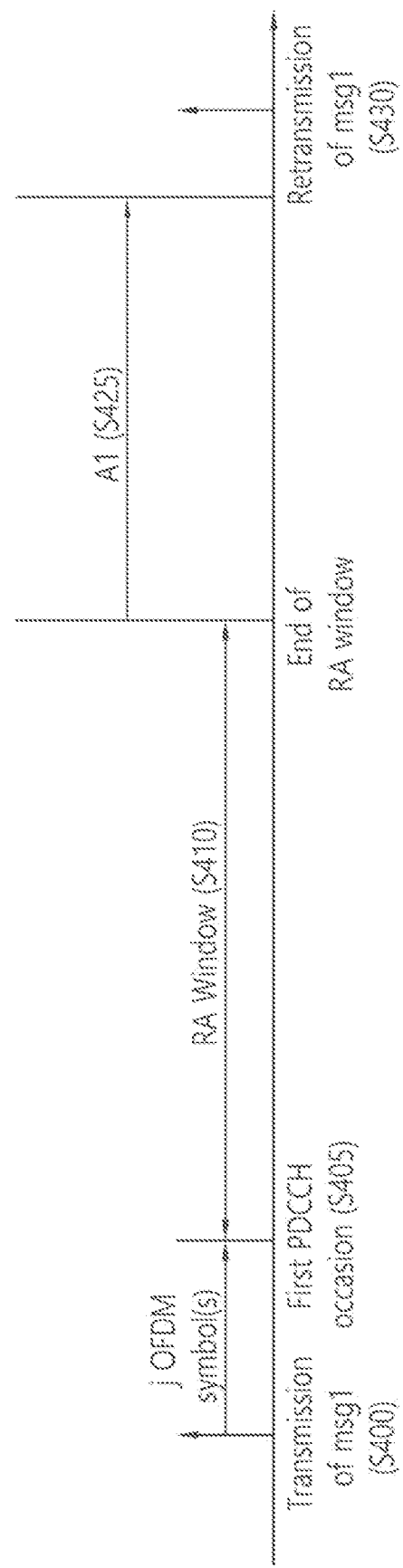
FIG. 6 illustrates another example of a retransmission timing of a random access preamble.

The UE may fail in receiving msg2 within RA window:

FIG. 6 illustrates another example of a retransmission timing of a random access preamble.

Referring to FIG. 6, operations S400 to S410 of FIG. 6 are identical to those of FIG. 4. Here, there is difference in that the UE fails in receiving msg2 within the RA window of operation S410 and the RA window ends.

In this case, the proposed A1 timing starts from a slot n or an OFDM symbol index i corresponding to a point at which the RA window ends (S625). When retransmission of the random access preamble is prepared during the proposed A1 timing, the UE retransmits msg1 after A1 (S630).

In FIG. 6, basically, in addition to a MAC layer processing delay time (L2) and a processing delay margin (delta value), the slot n, k, and N defined in FIG. 4 may be additionally used as timing determining parameters for determining the A1 timing. The A1 timing according thereto may be defined in the same manner as described above with reference to FIG. 4.

A transmission (or retransmission) of a plurality of random access preambles may be performed within a single random access procedure:

A contention free random access procedure may be used. Since a random access procedure is one, the single random access (RA) window is used even for a plurality of random access preambles.

Figure 7:
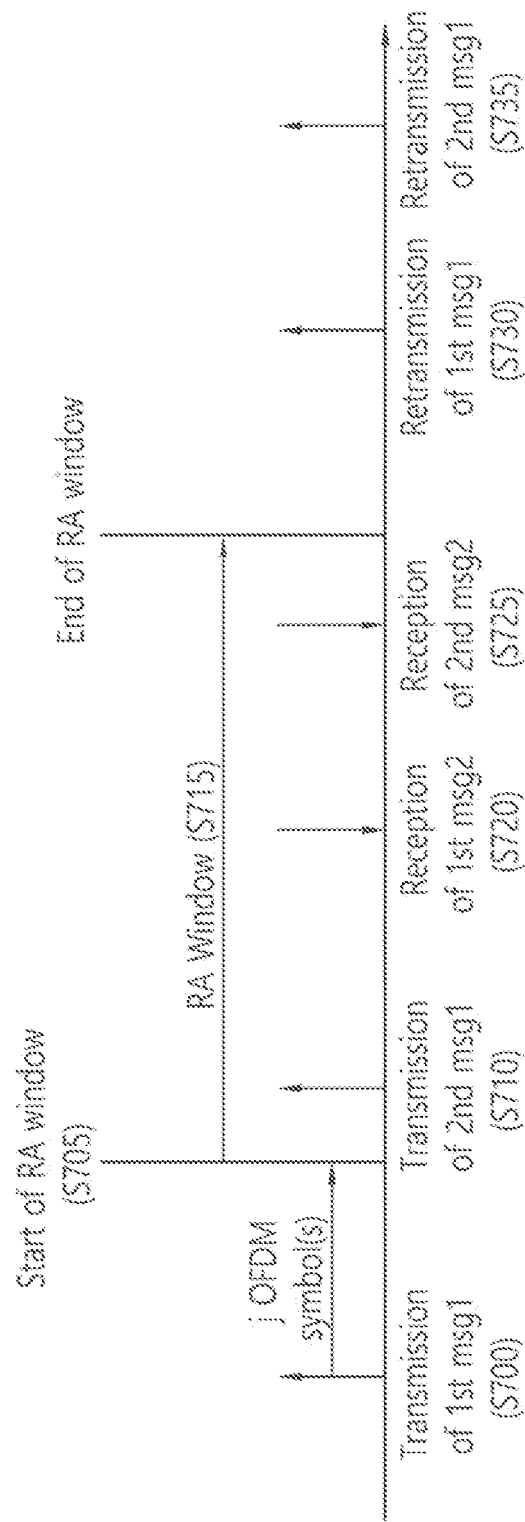
FIG. 7 illustrates an example of a timing for performing retransmission of a plurality of random access preambles.

FIG. 7 illustrates an example of a timing for performing retransmission of a plurality of random access preambles. Here, for clarity of description, description is made based on an example in which two random access preambles are transmitted.

Referring to FIG. 7, the UE transmits a plurality of random access preambles ($1^{st}$ msg1 and $2^{nd}$ msg1) in preamble transmission sections corresponding to different times (S700 and S710), and uses a dedicated RACH resource for each random access preamble. A RA window starts (S705). Within a single RA window S715, the UE receives a plurality of RARs ($1^{st}$ msg2 and $2^{nd}$ msg2) corresponding to transmission of the plurality of preambles, respectively (S720 and S725). Here, although the UE receives msg2, response information may not be included in msg2. In this case, it cannot be regarded that msg2 is successfully received. Also, although it is illustrated that the plurality of RARs is received in operations S720 and S725, respectively, one of the RARs may not be received. In this case, the UE retransmits $1^{st}$ msg1 and $2^{nd}$ msg1 at desired timings for retransmission of the plurality of msg1, respectively, (S730 and S735).

Here, a timing for performing a retransmission preparation for the plurality of msg1 needs to be defined.

For example, in response to a request from an upper layer, the UE completes a transmission preparation for a new first random access preamble within at least a time corresponding to a slot/non-slot n (or OFDM symbol index i)+(number of slots/non-slots, number of OFDM symbols, or sum of number of slots+number of OFDM symbols) by applying one proposed A1 timing (e.g., number of slots/non-slots, number of OFDM symbols, or sum of number of slots/non-slots+ number of OFDM symbols) including the basically proposed MAC layer processing delay time (L2) and the processing delay margin (delta value) of FIG. 6, starting from a last slot/non-slot n corresponding to the end of the RA window or an OFDM symbol index i within the slot/non-slot n. Hereinafter, it is assumed that the A1 timing basically includes the MAC layer processing delay time (L2) and the processing delay margin (delta value) and additionally uses the number of slots, the number of OFDM symbols, or the number of slots+number of OFDM symbols depending on different settings. That is, the UE may perform monitoring of msg2 until the RA window ends at all times and may set a timing for transmission of a next new random access preamble from the end of the RA window, since a point in time in which response information may be received within the RA window is not guaranteed. Accordingly, the UE may perform monitoring by the end of the RA window at all times and may determine whether to retransmit the random access preamble depending on a result of performing monitoring. The operations may be used, for example, if msg2 is received, if msg2 is not received within the RA window, or if msg2 is received but response information is not included in msg2.

The UE may complete a transmission preparation for a new first random access preamble within at least a time corresponding to a slot n (or OFDM symbol index i)+ (number of slots/non-slots, number of OFDM symbols, or sum of number of slots/non-slots+number of OFDM symbols) by applying one proposed A1 timing (e.g., number of slots/non-slots, number of OFDM symbols, or sum of number of slots/non-slots+number of OFDM symbols) of FIGS. 4 and 5, starting from a slot n in which a PDSCH corresponding to last msg2 among a plurality of msg2 is received or an OFDM symbol index i within the slot n. This example may apply to a case in which the UE receives all of msg2 with respect to transmission of a plurality of preambles and response information is not included in msg2. To prepare faster retransmission of the random access preamble, a timing for transmission of a new random access preamble may be determined based on the slot n (or the OFDM symbol index i within the slot n) in which the last msg2 among the plurality of msg2 is received. According to the timing requirements, the UE may prepare further optimized retransmission of a next random access preamble.

Here, the expression "completes a retransmission preparation for a random access preamble" indicates that a minimum amount of time is required to prepare transmission of the random access preamble in response to a request for transmitting the random access preamble from an upper layer. The UE performs retransmission of the random access preamble in a next PRACH occasion after the minimum amount of time is elapsed.

With the assumption that transmission of two random access preambles is set for a single RA procedure as shown in FIG. 7, four cases in which the UE needs to retransmit all of the two random access preambles are present as shown in Table 8.

TABLE 8

| Case | 1$^{st}$ msg2 | 2$^{nd}$ msg2 |
|---|---|---|
| 1 | Not received | Not received |
| 2 | Received, but response information is absent in msg2 | Not received |
| 3 | Not received | Received, but response information is absent in msg2 |
| 4 | Received, but response information is absent in msg2 | Received, but response information is absent in msg2 |

Case 1 to Case 4 do not correspond to a case in which the UE successfully receives two msg1 within the RA window. For example, Case 4 corresponds to a case in which the UE receives msg2 with respect to all of the preambles that are previously transmitted, however, response information, for example, RAPID, is not included in msg2. The UE may stop monitoring of msg2 only when the UE successfully receives at least one msg2 within a single RA window.

Preamble retransmission timing requirements for the respective Cases 1, 2, 3, and 4 may be set as described below:
- Case 1: In response to a request from an upper layer, the UE completes a transmission preparation for a new first random access preamble within at least a time corresponding to a slot n (or OFDM symbol index i)+(number of slots, number of OFDM symbols, or sum of number of slots+number of OFDM symbols) by applying one proposed A1 timing (e.g., number of slots, number of OFDM symbols, or sum of number of slots+number of OFDM symbols) of FIG. 6, starting from a last slot n corresponding to an end of an RA window or an OFDM symbol index i within the slot n.
- Case 2: In response to a request from an upper layer, the UE completes a transmission preparation for a new first random access preamble within at least a time corresponding to a slot n (or OFDM symbol index i)+(number of slots, number of OFDM symbols, or sum of number of slots+number of OFDM symbols) by applying one proposed A1 timing (e.g., number of slots, number of OFDM symbols, or sum of number of slots+number of OFDM symbols) of FIG. 6, starting from a last slot n corresponding to an end of an RA window or an OFDM symbol index i within the slot n.
- Case 3: In response to a request from an upper layer, the UE completes a transmission preparation for a new first random access preamble within at least a time corresponding to a slot n (or OFDM symbol index i)+(number of slots, number of OFDM symbols, or sum of number of slots+number of OFDM symbols) by applying one proposed A1 timing (e.g., number of slots, number of OFDM symbols, or sum of number of slots+number of OFDM symbols) of FIG. 6, starting from a last slot n corresponding to an end of an RA window or an OFDM symbol index i within the slot n.
- Case 4: Two methods may be considered for Case 4.

For example, in response to a request from an upper layer, the UE completes a transmission preparation for a new first random access preamble within at least a time corresponding to a slot n (or OFDM symbol index i)+(number of slots, number of OFDM symbols, or sum of number of slots+number of OFDM symbols) by applying one proposed A1 timing (e.g., number of slots, number of OFDM symbols, or sum of number of slots+number of OFDM symbols) of FIG. 6, starting from a last slot n corresponding to an end of an RA window or an OFDM symbol index i within the slot n.

As another example, the UE completes a transmission preparation for a new first random access preamble within at least a time corresponding to a slot n (or OFDM symbol index i)+(number of slots, number of OFDM symbols, or sum of number of slots+number of OFDM symbols) by applying one proposed A1 timing (e.g., number of slots, number of OFDM symbols, or sum of number of slots+number of OFDM symbols) of FIGS. 4 and 5, starting from a slot n in which a PDSCH corresponding to last msg2 among a plurality of msg2 is received or an OFDM symbol index i within the slot n.

Arranging Case 1 to Case 4, timing requirements for retransmission of a new random access preamble may be defined for the respective Cases 1 to 4, based on i) a case in which at least one msg2 does not include response information on a previous random access preamble, ii) the UE does not receive at least one msg2 with respect to the previous random access preamble, or iii) a combination thereof, with the assumption that transmission of a plurality of random access preambles is set to the UE and at least one msg2 (RAR) with respect to transmission of the plurality of random access preambles is received within a single RA window.

Transmission Timing of msg3 between msg2 and msg3

A minimum time gap between msg2 and msg3 may be defined as N1+N2+L2+TA. N1 and N2 may be identical to N1 and N2 defined in First Clause. L2 denotes a MAC processing delay time and corresponds to a time of about 500 μs regardless of an SCS. TA denotes a timing advance value. The eNode B may set a TA for uplink synchronization reception between a plurality of UEs. The parameters N1, N2, L2, and TA for determining the minimum time gap are collectively referred to as a gap determining parameter.

Figure 8:
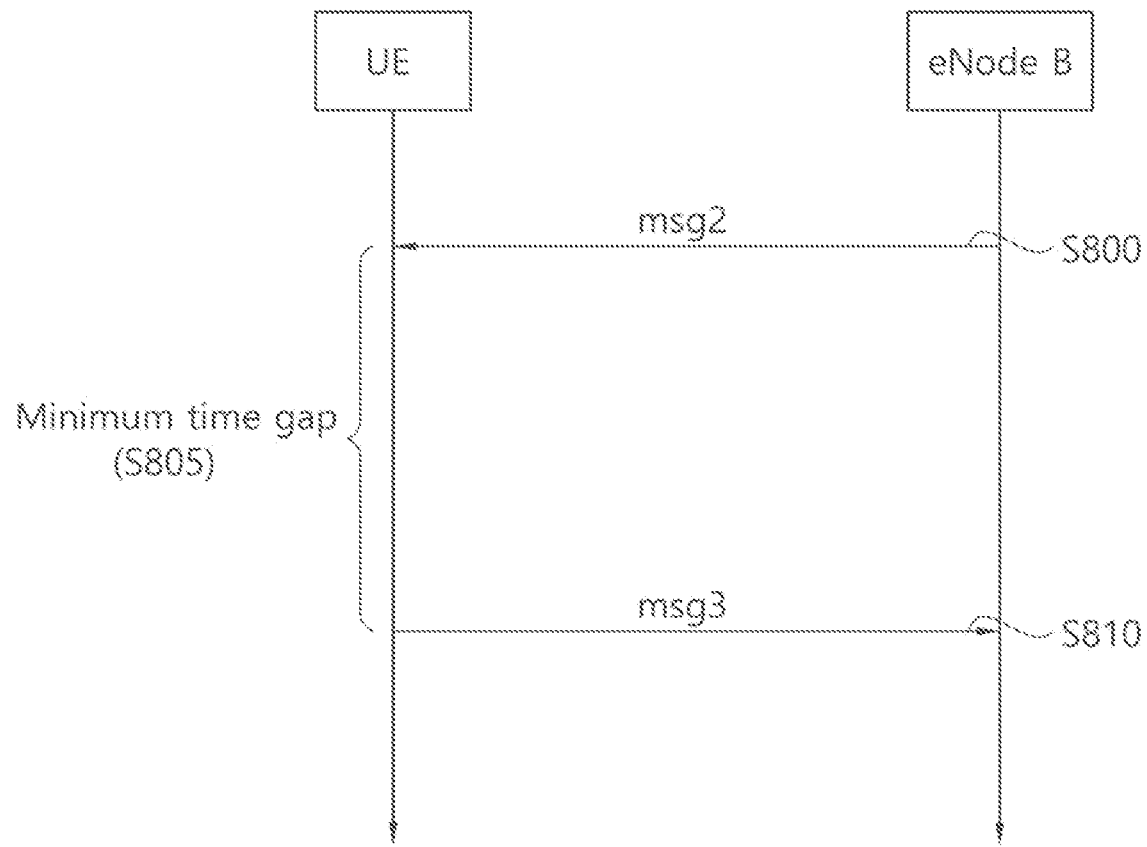
FIG. 8 illustrates an example of describing an msg3 transmission timing.

FIG. 8 illustrates an example of describing an msg3 transmission timing.

Referring to FIG. 8, the UE receives mgs2 in operation S800. If a minimum time gap is elapsed in operation S805, the UE transmits msg3 through a first available uplink resource for transmission of msg3 in operation S810. Accordingly, a point in time at which the UE actually transmits msg3 may be the minimum time gap+@. Here, the available uplink resource indicates an uplink resource with which the UE may perform transmission of msg3 in response to a configuration and indication of the eNode B. Here, if msg2 and msg3 correspond to different SCSs, a method of determining the minimum time gap (or a gap determining parameter) for transmission of msg3 needs to be additionally considered.

If L2 has a fixed value regardless of an SCS, the minimum time gap may be variably calculated based on an SCS used (or an SCS to be applied) to determine the time determining parameters, for example, N1, N2, and TA.

According to a first example, the minimum time gap is determined or derived based on a smaller SCS value between a first SCS of a slot in which msg2 is transmitted and a second SCS of a slot in which msg3 is transmitted. For example, if an SCS of msg2 is 15 kHz and an SCS of msg3 is 30 kHz, the minimum time gap is determined based on the 15 kHz SCS. In this example, the gap determining parameters N1, N2, and TA are determined as N1 corresponding to the 15 kHz SCS, N2 corresponding to the 15 kHz SCS, and TA corresponding to the 15 kHz SCS, respectively. The first example may be differently applied for each of bands that are divided based on a specific frequency. If the specific frequency is 6 GHz, the minimum time gap may be determined as shown in Table 9 if an SCS of msg3 and an SCS of msg3 differ from each other in a band of 6 GHz or less, and may be determined as shown in Table 10 if an SCS of msg2 and an SCS of msg3 differ from each other in the band of 6 GHz or more.

TABLE 9

| SCS of msg2 | SCS of msg3 | Minimum time gap determining method |
|---|---|---|
| 15 kHz | 30 kHz | - N1, N2, TA: are determined based on SCS of 15 kHz.<br>- L2: is determined based on MAC processing time regardless of SCS. |
| 30 kHz | 15 kHz | - N1, N2, TA: are determined based on SCS of 15 kHz.<br>- L2: is determined based on MAC processing time regardless of SCS. |

TABLE 10

| SCS of msg2 | SCS of msg3 | Minimum time gap determining method |
|---|---|---|
| 60 kHz | 120 kHz | - N1, N2, TA: are determined based on SCS of 60 kHz.<br>- L2: is determined based on MAC processing time regardless of SCS. |
| 120 kHz | 60 kHz | - N1, N2, TA: are determined based on SCS of 60 kHz.<br>- L2: is determined based on MAC processing time regardless of SCS. |

Referring to Table 9, all of gap determining parameters in the band of 60 GHz or less may be determined based on the SCS of 15 kHz. Referring to Table 10, all of gap determining parameters in the band of 60 GHz or more may be determined based on the SCS of 60 kHz. That is, the first example may fix an SCS value used to determine the minimum timing gap in a specific frequency range (less than or greater than or equal to 6 GHz) to a 15 kHz in the frequency range of 6 GHz or less and to 60 kHz in the frequency range of 6 GHz or more.

If the minimum time gap is set based on a smaller SCS, an earliest transmission timing of msg3 corresponding to the minimum time gap may be present in the middle of a single OFDM symbol time. On the contrary, if the minimum time gap is set based on a larger SCS, a further sufficient minimum time gap may be provided to the UE. Accordingly, the UE may readily receive msg2 and prepare transmission of msg3.

According to a second example, a portion of gap determining parameters for determining the minimum time gap may be determined in the same manner as in the first example and another portion of the gap determining parameters may be determined based on an independent SCS. According to an aspect, the independent SCS may include a larger SCS. For example, N1 and N2 may be set to N1 and N2 corresponding to the SCS of 15 kHz (, which is a smaller SCS), and TA may be set as a TA corresponding to the SCS of 30 kHz (, which is a larger SCS). According to another aspect, the independent SCS may include an SCS of msg3. According to another aspect, the independent SCS may include an SCS different from the SCS of N1 and N2. If TA is derived based on the SCS (e.g., the SCS set to msg3) different from that of N1 and N2, the minimum time gap may be calculated as shown in Table 11 and Table 12. Table 11 shows a case in which the SCS of msg2 and the SCS of msg3 differ from each other in the band of 6 GHz or less and Table 12 shows a case in which the SCS of msg2 and the SCS of msg3 differ from each other in the band of 6 GHz or more.

TABLE 11

| SCS of msg2 | SCS of msg3 | Minimum time gap determining method |
|---|---|---|
| 15 kHz | 30 kHz | - N1, N2: are determined based on SCS of 15 kHz.<br>- TA: is determined based on SCS of 30 kHz (msg3).<br>- L2: is determined based on MAC processing time regardless of SCS. |
| 30 kHz | 15 kHz | - N1, N2, TA: are determined based on SCS of 15 kHz.<br>- TA: are determined based on SCS of 15 kHz (msg3).<br>- L2: is determined based on MAC processing time regardless of SCS. |

TABLE 12

| SCS of msg2 | SCS of msg3 | Minimum time gap determining method |
|---|---|---|
| 60 kHz | 120 kHz | - N1, N2: are determined based on SCS of 60 kHz.<br>- TA: is determined based on SCS of 120 kHz (msg3).<br>- L2: is determined based on MAC processing time regardless of SCS. |
| 120 kHz | 60 kHz | - N1, N2, TA: are determined based on SCS of 60 kHz.<br>- TA: is determined based on SCS of 60 kHz (msg3).<br>- L2: is determined based on MAC processing time regardless of SCS. |

According to a third example, the minimum time gap is determined or derived based on msg2 or msg3. That is, gap determining parameters N1, N2, and TA are determined or derived based on one of msg2 and msg3. According to an aspect, the minimum time gap may be determined based on msg2. Table 13 relates to a method of determining the minimum time gap if the SCS of msg2 and the SCS of msg3 differ from each other in the band of 6 GHz or less and Table 14 relates to a method of determining the minimum time gap if the SCS of msg2 and the SCS of msg3 differ from each other in the band of 6 GHz or more.

TABLE 13

| SCS of msg2 | SCS of msg3 | Minimum time gap determining method |
|---|---|---|
| 15 kHz | 30 kHz | - N1, N2, TA: are determined based on SCS of 15 kHz (i.e., SCS of msg2).<br>- L2: is determined based on MAC processing time regardless of SCS. |
| 30 kHz | 15 kHz | - N1, N2, TA: are determined based on SCS of 30 kHz (i.e., SCS of msg2).<br>- L2: is determined based on MAC processing time regardless of SCS. |

TABLE 14

| SCS of msg2 | SCS of msg3 | Minimum time gap determining method |
|---|---|---|
| 60 kHz | 120 kHz | - N1, N2, TA: are determined based on SCS of 60 kHz (i.e., SCS of msg2).<br>- L2: is determined based on MAC |

TABLE 14-continued

| SCS of msg2 | SCS of msg3 | Minimum time gap determining method |
|---|---|---|
| 120 kHz | 60 kHz | processing time regardless of SCS.<br>- N1, N2, TA: are determined based on SCS of 120 kHz (i.e., SCS of msg2).<br>- L2: is determined based on MAC processing time regardless of SCS. |

According to another aspect, the minimum time gap may be determined based on msg3. Table 15 relates to a method of determining the minimum time gap if the SCS of msg2 and the SCS of msg3 differ from each other in the band of 6 GHz or less and Table 16 relates to a method of determining the minimum time gap if the SCS of msg2 and the SCS of msg3 differ from each other in the band of 6 GHz or more.

TABLE 15

| SCS of msg2 | SCS of msg3 | Minimum time gap determining method |
|---|---|---|
| 15 kHz | 30 kHz | - N1, N2, TA: are determined based on SCS of 30 kHz (i.e., SCS of msg3).<br>- L2: is determined based on MAC processing time regardless of SCS. |
| 30 kHz | 15 kHz | - N1, N2, TA: are determined based on SCS of 15 kHz (i.e., SCS of msg3).<br>- L2: is determined based on MAC processing time regardless of SCS. |

TABLE 16

| SCS of msg2 | SCS of msg3 | Minimum time gap determining method |
|---|---|---|
| 60 kHz | 120 kHz | - N1, N2, TA: are determined based on SCS of 120 kHz (i.e., SCS of msg3).<br>- L2: is determined based on MAC processing time regardless of SCS. |
| 120 kHz | 60 kHz | - N1, N2, TA: are determined based on SCS of 60 kHz (i.e., SCS of msg3).<br>- L2: is determined based on MAC processing time regardless of SCS. |

According to the third example, if the minimum time gap is determined based on an SCS of a specific message, for example, msg2, the UE may operate a further optimized minimum time gap for transmitting msg3. That is, dissimilar to the first example of determining the minimum time gap based on a smaller SCS at all time in a conservative manner, the third example relates to determining the minimum time gap by relatively fairly applying a smaller SCS or a larger SCS depending on an appropriate SCS combination between msg2 and msg3. Therefore, a transmission timing of msg3 may be generally further quickly derived.

According to a fourth example, a portion of time determining parameters for determining the minimum time gap may be determined based on the SCS of msg2 and another portion thereof may be determined based on the SCS of msg3. For example, N1 and N2 may be set as N1 and N2 corresponding to the SCS of msg2, respectively, and TA may be set as TA corresponding to the SCS of msg3. That is, dissimilar to the first example or the third example, TA may independently apply a single SCS. Table 17 relates to a method of determining the minimum time gap according to the fourth example if the SCS of msg2 and the SCS of msg3 differ from each other in the band of 6 GHz or less and Table 18 relates to a method of determining the minimum time gap according to the fourth example if the SCS of msg2 and the SCS of msg3 differ from each other in the band of 6 GHz or more.

TABLE 17

| SCS of msg2 | SCS of msg3 | Minimum time gap determining method |
|---|---|---|
| 15 kHz | 30 kHz | - N1, N2: are determined based on SCS of 15 kHz (i.e., SCS of msg2).<br>- TA: is determined based on SCS of 30 kHz (i.e., SCS of msg3).<br>- L2: is determined based on MAC processing time regardless of SCS. |
| 30 kHz | 15 kHz | - N1, N2: are determined based on SCS of 30 kHz (i.e., SCS of msg2).<br>- TA: is determined based on SCS of 15 kHz (i.e., SCS of msg3).<br>- L2: is determined based on MAC processing time regardless of SCS. |

TABLE 18

| SCS of msg2 | SCS of msg3 | Minimum time gap determining method |
|---|---|---|
| 60 kHz | 120 kHz | - N1, N2: are determined based on SCS of 60 kHz (i.e., SCS of msg2).<br>- TA: is determined based on SCS of 120 kHz (i.e., SCS of msg3).<br>- L2: is determined based on MAC processing time regardless of SCS. |
| 120 kHz | 60 kHz | - N1, N2: are determined based on SCS of 120 kHz (i.e., SCS of msg2).<br>- TA: is determined based on SCS of 60 kHz (i.e., SCS of msg3).<br>- L2: is determined based on MAC processing time regardless of SCS. |

Figure 9:
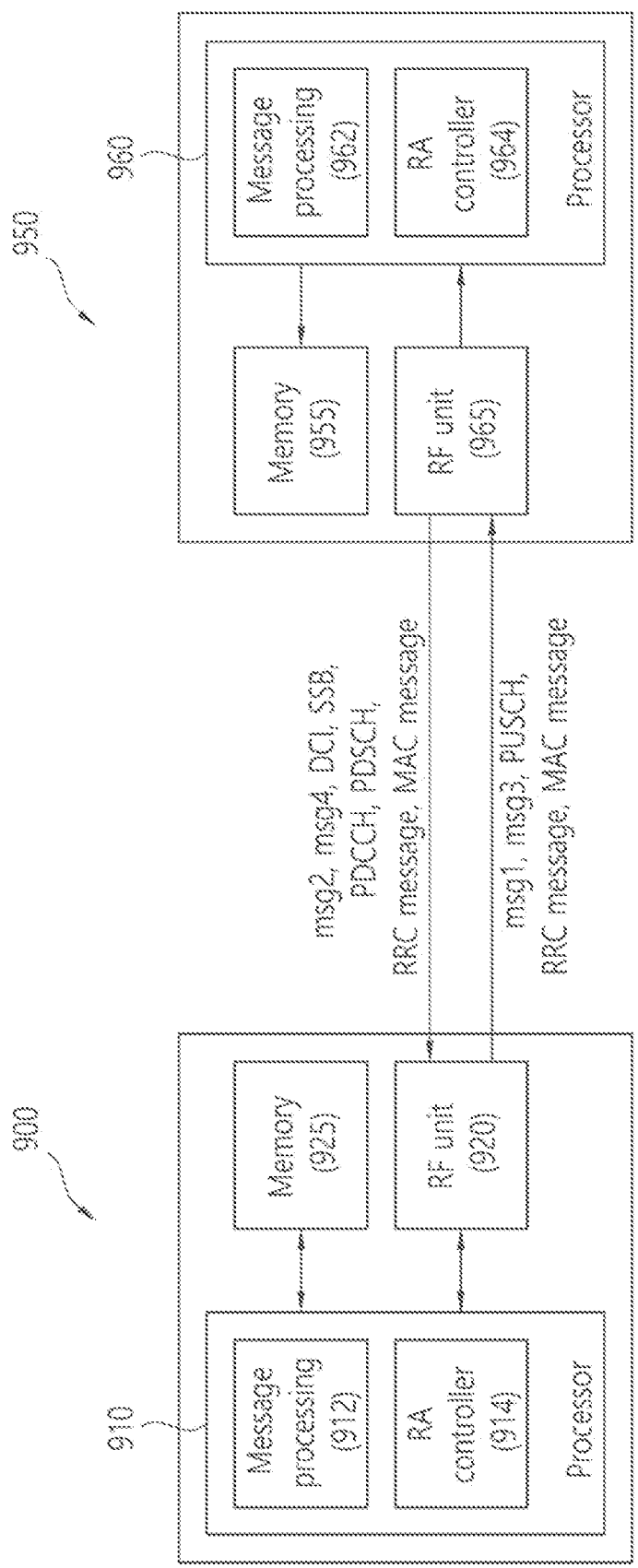
FIG. 9 is a block diagram illustrating an example of a user equipment (UE) and an evolved node base (eNode B).

FIG. 9 is a block diagram illustrating a UE and an eNode B.

Referring to FIG. 9, a UE 900 includes a processor 910, a memory 925, and a radio frequency (RF) unit 920. The processor 910 includes a messaging processing 912 and a random access (RA) controller 914.

The processor 910 is configured to perform a random access function, process, and/or method in an NR system proposed herein. In detail, the processor 910 may perform a portion of or all of the operations of the UE 900 described herein, and also performs an operation of generating and controlling an uplink control signal (e.g., random access preamble (msg1), PUCCH) of the UE 900, uplink data (e.g., msg3, PUSCH), or an uplink message (RRC message or MAC message) of the UE 900, which is described above with reference to FIGS. 1 to 8. Also, as described above with reference to FIGS. 1 to 8, the UE 900 performs an operation of generating and controlling a downlink control signal (e.g., DCI, SSB, msg2, PDCCH), downlink data (e.g., msg4, PDSCH), or a downlink message (RRC message, MAC message), received from an eNode B 950. The memory 925 is connected to the processor 910 and stores a variety of information required to drive the processor 910. All of the operations of the message processing 912 and the RA controller 914 belong to those of the processor 910.

The RF unit 920 is connected to the processor 910 and transmits and/or receives a wireless signal. For example, the RF unit 920 may transmit control either information or data, or all of the control information and the data to the eNode B 950 or may receive either control information or data, or all of the control information and the data from the eNode B 950.

The RF unit 920 may receive a signal, information, an RRC message, and a MAC message transmitted from the eNode B 950 to the UE 900 during a random access procedure disclosed herein. In detail, the RF unit 920 may receive msg2, msg4, DCI, SSB, a PDCCH, a PDSCH, an RRC message, and a MAC message from the eNode B 950. V2X exclusive configuration information or V2X shared configuration information may have functions and configurations according to the V2X exclusive configuration information and the V2X shared configuration information described above with reference to FIGS. 1 to 13 disclosed herein.

The message processing 912 restores and/or decodes the received msg2, msg4, DCI, SSB, PDCCH, PDSCH, RRC message, and MAC message, and transmits information to the RA controller 914. Alternatively, the message processing 912 generates an uplink control signal (e.g., random access preamble (msg1), PUCCH) transmitted from the UE 900 to the eNode B 950, uplink data (e.g., msg3, PUSCH), or an uplink message (RRC message, MAC message) of the UE 900, and transmits the generated uplink control signal, uplink data, or uplink message to the RF unit 920. The RF unit 920 transmits the RRC message or the MAC message to the eNode B 950.

The RA controller 914 controls and performs all of the operations associated with the random access procedure of the UE 900 disclosed herein, based on the transmitted information.

According to an aspect, the RA controller 914 may perform the random access procedure of the UE 900 described with reference to FIG. 8. The RA controller 914 may control a retransmission timing, operate a random access (RA) window, and retransmit one or more random access preambles depending on the features of FIGS. 4 to 7 regarding a retransmission timing of a random access preamble.

According to another aspect, the RA controller 914 may control a transmission operation of msg3 depending on the features of FIG. 8 regarding a minimum time gap between msg2 and msg3.

The RA controller 914 may simultaneously determine the retransmission timing and the minimum time gap of the random access preamble depending on one or more features described herein.

The eNode B 950 includes a memory 955, a processor 960, and an RF unit 965. The processor 960 includes a message constructor 962 and an RA controller 964.

The processor 960 may perform a portion of or all of the operations of the eNode B 950 described herein, and performs an operation of generating and controlling either control information or data, or all of the control information and the data, according to FIGS. 1 to 8. The memory 955 is connected to the processor 960 and stores a variety of information required to drive the processor 960. All of the operations of the message constructor 962 and the RA controller 964 belong to those of the processor 960.

The RF unit 965 is connected to the processor 960 and transmits and/or receives a wireless signal. For example, the RF unit 965 may transmit either information or data, or all of the control information and the data to the UE 900, or may receive either information or data, or all of the control information and the data from the UE 900.

A wireless device (e.g., a UE) may transmit, to a base station (e.g., an eNode B), a first random access preamble. The wireless device may determine a time window for monitoring for a random access response. The time window may be determined based on a transmission time point associated with the first random access preamble. For example, a time duration of one or more symbols may exist between the start time of the time window and the termination of the random access preamble transmission. During the time window, the wireless device may monitor for a random access response sent for the wireless device. The wireless device may receive a random access response sent for the wireless device. The wireless device may receive, during the time window, a first random access response. The first random access response may be sent for another wireless device. For example, the first random access response may not include response information for the wireless device. To retrieve response information for the wireless device, the wireless device may receive a downlink control channel (e.g., PDCCH) scrambled by an RA-RNTI, and may attempt to decode a downlink shared channel (e.g., PDSCH) indicated by the downlink control channel. The wireless device may not successfully decode the downlink shared channel. The wireless device may determine that the first random access response lacks information responsive to the first random access preamble and determine, based on the first random access response lacking the information responsive to the first random access preamble, a retransmission of a random access preamble. The wireless device may prepare, based on the first random access response, a transmission of a second random access preamble. The wireless device may prepare the transmission of the second random access preamble, for example, if the first random access response is not for the wireless device, if the wireless device does not correctly retrieve the response information form the first random access response, etc. The wireless device may set a time for the preparing based on one of a first subcarrier spacing associated with the first random access preamble and a second subcarrier spacing associated with the first random access response. For example, the wireless device may determine, based on the one of the first subcarrier spacing and the second subcarrier spacing, a timing requirement for completing the preparing. The timing requirement may be further based on a reception time of the first random access response. The timing requirement may be further based on a quantity of symbols associated with a configuration of an additional demodulation reference signal (DMRS). The wireless device may transmit, based on the preparing, the second random access preamble.

The wireless device may determine a supplementary uplink cell in which the first random access preamble is to be transmitted. The first subcarrier spacing may be associated with the supplementary uplink cell and may be different from the second subcarrier spacing. The second subcarrier spacing may be associated with a downlink carrier in which the first random access response is received. The supplementary uplink cell may comprise an uplink carrier that supplements a different uplink carrier for the wireless device. The first subcarrier spacing may comprise a subcarrier spacing of an uplink bandwidth part via which the first random access preamble is transmitted. The second subcarrier spacing may comprise a subcarrier spacing associated with a slot in which the first random access response is received.

The wireless device may transmit, to a base station, a first random access preamble. The wireless device may determine, based on a transmission time point associated with the first random access preamble, a time window for monitoring for a random access response. The wireless device may determine that a random access preamble associated with the first random access preamble has not been detected during the time window. The wireless device may prepare, based on an expiration of the time window, a transmission of a second random access preamble, wherein a time for the preparing is set based on one of: a first subcarrier spacing associated with the first random access preamble; and a second subcarrier spacing associated with a downlink channel scheduled for the random access response. The wireless device may transmit, based on the preparing, the second random access preamble.

The wireless device may determine a supplementary uplink cell in which the first random access preamble is to be transmitted. The first subcarrier spacing may be associated with the supplementary uplink cell and may be different from the second subcarrier spacing. The first subcarrier spacing may comprise a subcarrier spacing of an uplink bandwidth part via which the first random access preamble is transmitted. The wireless device may determine, based on the one of the first subcarrier spacing and the second subcarrier spacing, a timing requirement for completing the preparing. The timing requirement may be further based on an expiration time of the time window.

The wireless device may transmit, to a base station, a random access preamble. The wireless device may receive a random access response that is responsive to the random access preamble. The wireless device may prepare, based on one or more transport blocks of the random access response, an uplink transmission that is responsive to the random access response. The wireless device may set a time for the preparing based on one of a subcarrier spacing associated with the random access response and a subcarrier spacing associated with the uplink transmission. The wireless device may perform, based on the preparing, the uplink transmission. The wireless device may determine a smaller subcarrier spacing between the subcarrier spacing associated with the random access response and the subcarrier spacing associated with the uplink transmission. The wireless device may determine, based on the smaller subcarrier spacing, the time for the preparing. The wireless device may determine a first time parameter based on the smaller subcarrier spacing. The wireless device may determine a second time parameter based on the smaller subcarrier spacing. The time for the preparing may be based on the first time parameter and the second time parameter. The time for the preparing may be based on the first time parameter, the second time parameter, and a processing delay time (e.g., a sum of the first time parameter, the second time parameter, and a processing delay time). The processing delay time may be 500 μs.

Effects obtainable from the present disclosure are not limited thereto and other effects not described herein may be explicitly understood by one of ordinary skill in the art to which this disclosure pertains from the description set forth as below.

The processors may include an application-specific integrated circuit (ASIC), another chipset, a logic circuit, and/or a data processing device. The memories may include a Read-Only Memory (ROM), a Random Access Memory (RAM), a flash memory, a memory card, a storage medium and/or another storage device. The RF units may include a baseband circuit for processing a wireless signal. When an embodiment is embodied as software, the described scheme may be embodied as a module (process, function, or the like) that executes the described function. The module may be stored in a memory, and may be executed by a processor. The memory may be disposed inside or outside the processor, and may be connected to the processor through various well-known means.

In the described exemplary system, although methods are described based on a flowchart as a series of steps or blocks, aspects of the present disclosure are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present disclosure.

What is claimed is:

1. A wireless device comprising:
a wireless transceiver;
one or more processors; and
memory storing instructions that, when executed by the one or more processors, cause the wireless device to:
transmit, to a base station, a first random access preamble;
receive, during a time window, a first random access response, wherein the time window is based on a transmission time point associated with the first random access preamble; and
transmit, after receiving the first random access response, a second random access preamble, wherein a preparation time for transmitting the second random access preamble is set based on one of:
a first subcarrier spacing associated with the first random access preamble; or
a second subcarrier spacing associated with the first random access response.

2. The wireless device of claim 1, wherein the instructions, when executed by the one or more processors, cause the wireless device to:
determine a supplementary uplink cell via which the first random access preamble is to be transmitted,
wherein the first subcarrier spacing is associated with the supplementary uplink cell and is different from the second subcarrier spacing, and
wherein the second subcarrier spacing is associated with a downlink carrier via which the first random access response is received.

3. The wireless device of claim 2, wherein the supplementary uplink cell comprises an uplink carrier that supplements a different uplink carrier for the wireless device.

4. The wireless device of claim 1, wherein the first subcarrier spacing comprises a subcarrier spacing of an uplink bandwidth part via which the first random access preamble is transmitted.

5. The wireless device of claim 1, wherein the second subcarrier spacing comprises a subcarrier spacing associated with a slot in which the first random access response is received.

6. The wireless device of claim 1, wherein the instructions, when executed by the one or more processors, cause the wireless device to:
determine that the first random access response lacks information responsive to the first random access preamble; and
determine, based on the first random access response lacking the information responsive to the first random access preamble, to transmit the second random access preamble.

7. The wireless device of claim 1, wherein the instructions, when executed by the one or more processors, cause the wireless device to:
determine reception of the first random access response, based on:
a downlink control channel scrambled by a random access radio network temporary identifier; and
a downlink shared channel associated with the downlink control channel.

8. The wireless device of claim 1, wherein the instructions, when executed by the one or more processors, cause the wireless device to:
   determine, based on the one of the first subcarrier spacing or the second subcarrier spacing, a timing requirement for completing a preparation for transmitting the second random access preamble.

9. The wireless device of claim 8, wherein the timing requirement is further based on a reception time of the first random access response.

10. The wireless device of claim 8, wherein the timing requirement is further based on a quantity of symbols associated with a configuration of an additional demodulation reference signal (DMRS).

11. The wireless device of claim 1, wherein the instructions, when executed by the one or more processors, cause the wireless device to transmit the second random access preamble by transmitting, within a time period that starts from a reception time of the first random access response, the second random access preamble, and
   wherein the time period that starts from the reception time of the first random access response is based on one of:
      the first subcarrier spacing associated with the first random access preamble; or
      the second subcarrier spacing associated with the first random access response.

12. The wireless device of claim 1, wherein the instructions, when executed by the one or more processors, cause the wireless device to:
   select, based on the first subcarrier spacing and the second subcarrier spacing being different, the one of the first subcarrier spacing or the second subcarrier spacing.

13. The wireless device of claim 1, wherein the instructions, when executed by the one or more processors, cause the wireless device to:
   select a larger subcarrier spacing between the first subcarrier spacing and the second subcarrier spacing,
   wherein the time between receiving the first random access response and transmitting the second random access preamble is based on the larger subcarrier spacing.

14. The wireless device of claim 1, wherein the instructions, when executed by the one or more processors, cause the wireless device to:
   select a smaller subcarrier spacing between the first subcarrier spacing and the second subcarrier spacing,
   wherein the time between receiving the first random access response and transmitting the second random access preamble is based on the smaller subcarrier spacing.

15. The wireless device of claim 1, wherein the instructions, when executed by the one or more processors, cause the wireless device to:
   receive a second random access response that is responsive to the second random access preamble; and
   transmit, based on the second random access response and via a physical uplink shared channel (PUSCH), an uplink signal associated with the second random access response, wherein a time between receiving the second random access response and transmitting the uplink signal is based on one of:
      a subcarrier spacing associated with the second random access response; or
      a subcarrier spacing associated with the uplink signal.

16. The wireless device of claim 15, wherein the instructions, when executed by the one or more processors, cause the wireless device to:
   determine a smaller subcarrier spacing between the subcarrier spacing associated with the second random access response and the subcarrier spacing associated with the uplink signal; and
   determine, based on the smaller subcarrier spacing, the time between receiving the second random access response and transmitting the uplink signal.

17. The wireless device of claim 16, wherein the instructions, when executed by the one or more processors, cause the wireless device to:
   determine a first time parameter based on the smaller subcarrier spacing; and
   determine a second time parameter based on the smaller subcarrier spacing,
   wherein the time between receiving the second random access response and transmitting the uplink signal is based the first time parameter and the second time parameter.

18. The wireless device of claim 17, wherein the time between receiving the second random access response and transmitting the uplink signal is based on a minimum time between receiving the second random access response and transmitting the uplink signal, and
   wherein the minimum time is based on the first time parameter, the second time parameter, and a processing delay time.

19. A wireless device comprising:
   a wireless transceiver;
   one or more processors; and
   memory storing instructions that, when executed by the one or more processors, cause the wireless device to:
      transmit, to a base station, a first random access preamble;
      determine that a random access response associated with the first random access preamble has not been detected during a time window, wherein the time window is based on a transmission time point associated with the first random access preamble; and
      transmit, based on an expiration of the time window, a second random access preamble, wherein a preparation time for transmitting the second random access preamble is set based on one of:
         a first subcarrier spacing associated with the first random access preamble; or
         a second subcarrier spacing associated with a downlink channel for the random access response.

20. The wireless device of claim 19, wherein the instructions, when executed by the one or more processors, cause the wireless device to:
   determine a supplementary uplink cell via which the first random access preamble is to be transmitted, and
   wherein the first subcarrier spacing is associated with the supplementary uplink cell and is different from the second subcarrier spacing.

21. The wireless device of claim 19, wherein the first subcarrier spacing comprises a subcarrier spacing of an uplink bandwidth part via which the first random access preamble is transmitted.

22. The wireless device of claim 19, wherein the instructions, when executed by the one or more processors, cause the wireless device to:
   determine, based on the one of the first subcarrier spacing or the second subcarrier spacing, a timing requirement for completing a preparation for transmitting the second random access preamble.

23. The wireless device of claim 22, wherein the timing requirement is further based on an expiration time of the time window.

24. The wireless device of claim 19, wherein the instructions, when executed by the one or more processors, cause the wireless device to transmit the second random access preamble by transmitting, within a time period that starts from an expiration time of the time window, the second random access preamble, and
wherein the time period that starts from the expiration time of the time window is based on one of:
the first subcarrier spacing associated with the first random access preamble; or
the second subcarrier spacing associated with the downlink channel for the random access response.

25. The wireless device of claim 19, wherein the instructions, when executed by the one or more processors, cause the wireless device to:
select, based on the first subcarrier spacing and the second subcarrier spacing being different, the one of the first subcarrier spacing or the second subcarrier spacing.

26. The wireless device of claim 19, wherein the instructions, when executed by the one or more processors, cause the wireless device to:
select a larger subcarrier spacing between the first subcarrier spacing and the second subcarrier spacing,
wherein the time between the expiration of the time window and transmitting the second random access preamble is based on the larger subcarrier spacing.

27. The wireless device of claim 19, wherein the instructions, when executed by the one or more processors, cause the wireless device to:
select a smaller subcarrier spacing between the first subcarrier spacing and the second subcarrier spacing,
wherein the time between the expiration of the time window and transmitting the second random access preamble is based on the smaller subcarrier spacing.

28. The wireless device of claim 19, wherein the instructions, when executed by the one or more processors, cause the wireless device to:
receive a second random access response that is responsive to the second random access preamble; and
transmit, based on the second random access response and via a physical uplink shared channel (PUSCH), an uplink signal associated with the second random access response, wherein a time between receiving the second random access response and transmitting the uplink signal is based on one of:
a subcarrier spacing associated with the second random access response; or
a subcarrier spacing associated with the uplink signal.

29. The wireless device of claim 28, wherein the instructions, when executed by the one or more processors, cause the wireless device to:
determine a smaller subcarrier spacing between the subcarrier spacing associated with the second random access response and the subcarrier spacing associated with the uplink signal; and
determine, based on the smaller subcarrier spacing, the time between receiving the second random access response and transmitting the uplink signal.

30. The wireless device of claim 29, wherein the instructions, when executed by the one or more processors, cause the wireless device to:
determine a first time parameter based on the smaller subcarrier spacing; and
determine a second time parameter based on the smaller subcarrier spacing,
wherein the time between receiving the second random access response and transmitting the uplink signal is based the first time parameter and the second time parameter.

31. The wireless device of claim 30, wherein the time between receiving the second random access response and transmitting the uplink signal is based on a minimum time between receiving the second random access response and transmitting the uplink signal, and
wherein the minimum time is based on the first time parameter, the second time parameter, and a processing delay time.

32. A wireless device comprising:
a wireless transceiver;
one or more processors; and
memory storing instructions that, when executed by the one or more processors, cause the wireless device to:
transmit, to a base station, a first random access preamble;
determine that a random access response associated with the first random access preamble has not been detected during a time window, wherein the time window is based on a transmission time point associated with the first random access preamble; and
transmit, based on an expiration of the time window, a second random access preamble, wherein a preparation time for transmitting the second random access preamble is set based on one of:
a first subcarrier spacing associated with an uplink channel; or
a second subcarrier spacing associated with a downlink channel.

33. The wireless device of claim 32, wherein the uplink channel is associated with the first random access preamble, and
wherein the downlink channel comprises a downlink channel for the random access response.

34. The wireless device of claim 32, wherein the instructions, when executed by the one or more processors, cause the wireless device to:
determine a supplementary uplink cell via which the first random access preamble is to be transmitted, and
wherein the first subcarrier spacing is associated with the supplementary uplink cell and is different from the second subcarrier spacing.

35. The wireless device of claim 32, wherein the first subcarrier spacing comprises a subcarrier spacing of an uplink bandwidth part via which the first random access preamble is transmitted.

36. The wireless device of claim 32, wherein the instructions, when executed by the one or more processors, cause the wireless device to:
determine, based on the one of the first subcarrier spacing or the second subcarrier spacing, a timing requirement for completing a preparation for transmitting the second random access preamble.

37. The wireless device of claim 36, wherein the instructions, when executed by the one or more processors, cause the wireless device to determine, based on the first subcarrier spacing, the timing requirement for completing a preparation for transmitting the second random access preamble, and
wherein the first subcarrier spacing is smaller than the second subcarrier spacing.

38. The wireless device of claim 36, wherein the instructions, when executed by the one or more processors, cause the wireless device to determine, based on the second subcarrier spacing, the timing requirement for completing a preparation for transmitting the second random access preamble, and
wherein the second subcarrier spacing is smaller than the first subcarrier spacing.

39. The wireless device of claim 32, wherein the instructions, when executed by the one or more processors, cause the wireless device to:
receive a second random access response that is responsive to the second random access preamble; and
transmit, based on the second random access response and via a physical uplink shared channel (PUSCH), an uplink signal associated with the second random access response, wherein a time between receiving the second random access response and transmitting the uplink signal is based on one of:
a subcarrier spacing associated with the second random access response; or
a subcarrier spacing associated with the uplink signal.

40. The wireless device of claim 39, wherein the instructions, when executed by the one or more processors, cause the wireless device to:
determine a smaller subcarrier spacing between the subcarrier spacing associated with the second random access response and the subcarrier spacing associated with the uplink signal; and
determine, based on the smaller subcarrier spacing, the time between receiving the second random access response and transmitting the uplink signal.

41. The wireless device of claim 40, wherein the instructions, when executed by the one or more processors, cause the wireless device to:
determine a first time parameter based on the smaller subcarrier spacing; and
determine a second time parameter based on the smaller subcarrier spacing,
wherein the time between receiving the second random access response and transmitting the uplink signal is based the first time parameter and the second time parameter.

42. The wireless device of claim 41, wherein the time between receiving the second random access response and transmitting the uplink signal is based on a minimum time between receiving the second random access response and transmitting the uplink signal, and
wherein the minimum time is based on the first time parameter, the second time parameter, and a processing delay time.

* * * * *